Dec. 23, 1969        J. M. KEMPER        3,485,161
CABIN PRESSURE REGULATOR
Filed Jan. 2, 1968        3 Sheets-Sheet 2
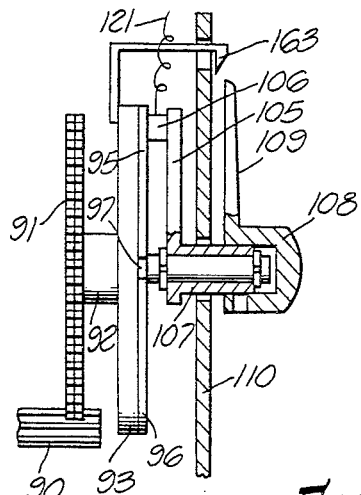
FIG. 2.
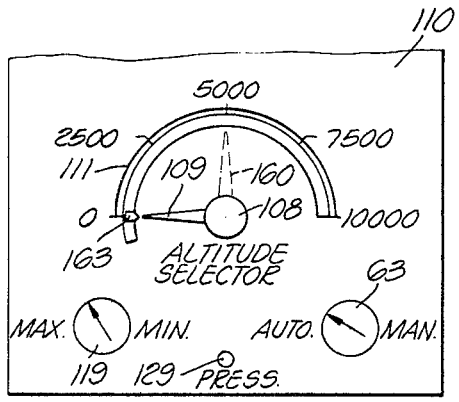
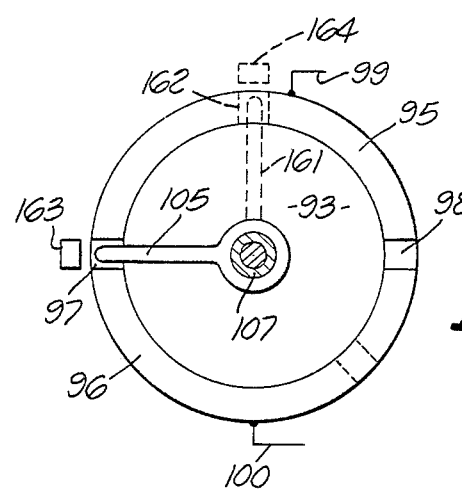
FIG. 4.
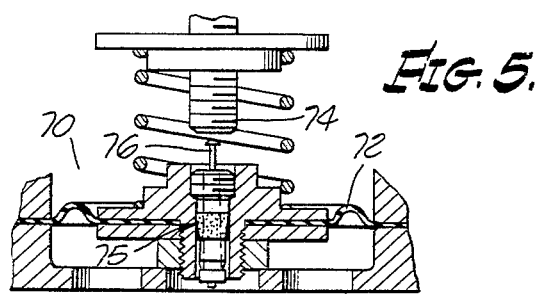
FIG. 5.
JAMES M. KEMPER
INVENTOR
WHANN & McMANIGAL
Attorneys for Applicant
BY

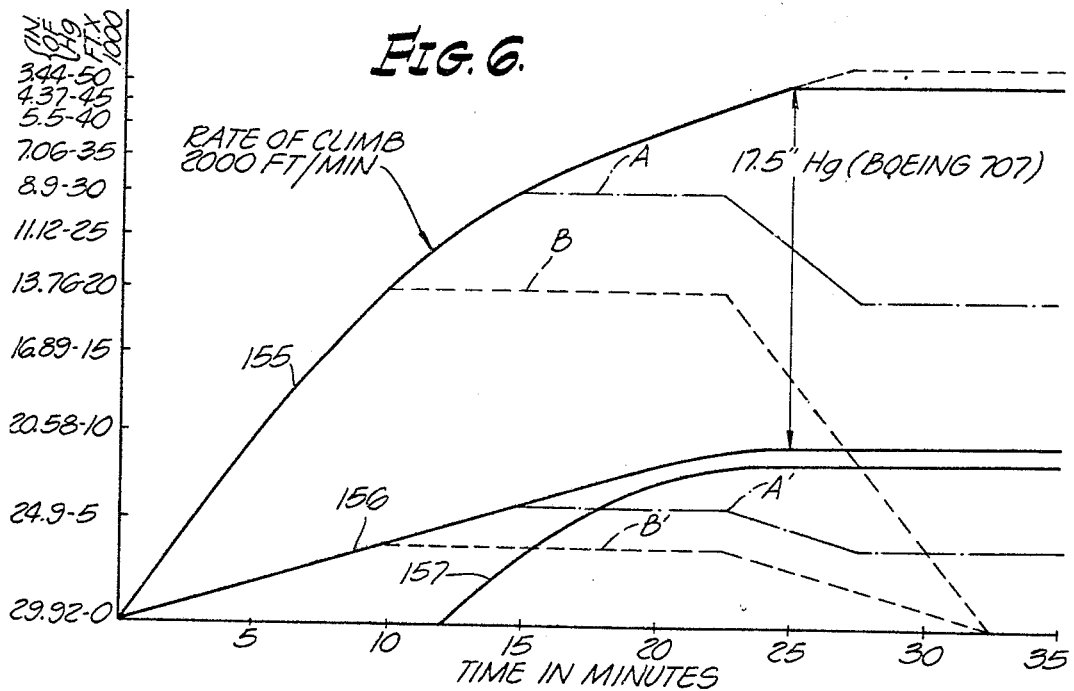
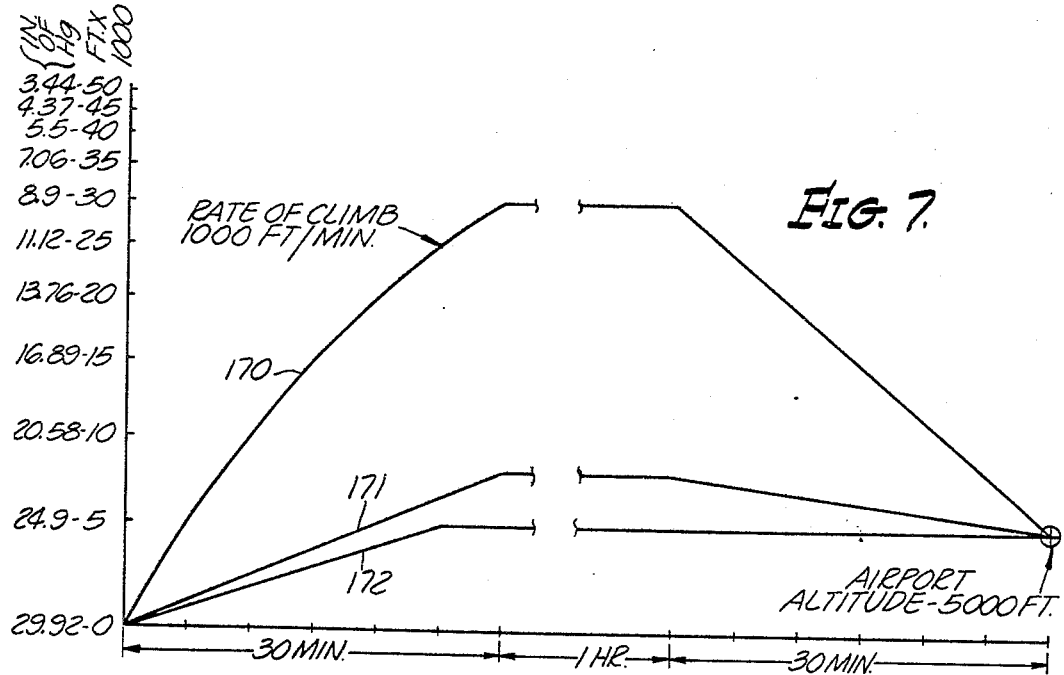

United States Patent Office 3,485,161
Patented Dec. 23, 1969

3,485,161
CABIN PRESSURE REGULATOR
James M. Kemper, Hollywood, Calif., assignor of one-half to R. Welton Whann, Los Angeles, Calif.
Filed Jan. 2, 1968, Ser. No. 695,152
Int. Cl. B64d 13/04; G05d 16/20
U.S. Cl. 98—1.5                                    20 Claims

ABSTRACT OF THE DISCLOSURE

A pressure regulator controlling the pressure of an enclosure adapted to move at different altitudes, having a chamber with an inflow passage and an outflow passage, a valve for controlling one of said passages, an isobaric control in said chamber, a pivoted arm in said chamber through which said isobaric control is connected to said valve, a spring connected to said arm, a rate of change means for adjusting the tension of the spring, means for setting the isobaric control to cause the pressure in the chamber to be approximately ambient pressure at one location, means for resetting the isobaric control to cause the pressure in said chamber to be approximately the same as ambient pressure at a second location, means for exerting a force opposite to the spring to position the valve so as to decrease the pressure in the chamber or to change the position of the valve of the chamber for controlling the rate at which the pressure of the chamber may change.

STATE OF THE ART

At the present time there are numerous cabin pressure regulators for controlling the pressure in and ventilation through a cabin. There are probably 50 to 100 patents disclosing various forms and typical of these patents are Widgery et al. Patent No. 2,463,487, Del Mar Patent No. 2,549,673, Kemper Patent No. 2,696,153, Kemper Patent No. 2,463,489, and Kemper Patent No. 2,749,829.

Cabin pressure regulators of the general type to which this invention relates have control apparatus for controlling the pressure in the aircraft cabin (or other enclosure) which is provided with a source of air under pressure. Aircraft designed for flight at high altitudes are made with air-tight cabins and are provided with an air compressor for ventilation and pressurization of the cabin. The pressure in the cabin is usually controlled by a valve which controls the out-flow of air from the cabin. It is not practical to build an aircraft in which the cabin is stressed to hold a ground pressure level in the cabin when the airplane is flying at maximum altitude. Therefore, commercial aircraft must be provided with means of slowly decreasing cabin pressure as the aircraft climbs so that the cabin is not over-pressurized, and when the pressure differential reaches a certain value a differential control or safety valve will open.

In aircraft controls with which I am familiar, the pilot is required to set the maximum altitude at which he intends to fly and to set the rate of pressure change in the cabin. These settings are made before take-off or very soon thereafter. Adjustments must be made before descending so that when the plane lands the pressure within the cabin and outside the cabin will be the same. It is necessary that the pilot calculate the time of landing and the rate of descent of the aircraft so as to be able to set proper values. If there is an error in the pilot's calculations pressure in the cabin at landing will not be the same as pressure outside the aircraft and air popping of passengers' ears will occur when the plane lands.

Summary of the invention

My invention relates to pressure control means or ventilation means under pressure control for enclosures in which predetermined pressures or predetermined changes in pressures must be maintained and relates more particularly to enclosures adapted to move at different altitudes. One important use of my invention is an aircraft wherein it is necessary to maintain the aircraft cabin at certain pressures not only for passenger comfort, but also for safety. My invention will be described in connection with a form of my invention particularly suitable for use in aircraft, with the understanding that the invention has other broader uses.

The regulator of my present invention is particularly designed to avoid the disadvantages of prior art regulators and to accomplish new and important results. In my invention if the airplane has a flight schedule where the take-off and landing altitudes are the same, such, for example, as would occur in a flight from Los Angeles to San Francisco, or Los Angeles to New York, the regulator, when set for automatic operation, will keep the aircraft cabin at the greatest possible comfort level and require no attention whatsoever from the pilot and will not involve mathematical calculations on how to set the rate of pressure change of the cabin for the greatest comfort. Also, my invention includes automatic means for sensing differential pressure between a reference pressure in the chamber of the regulator and atmospheric pressure so that as the aircraft climbs or descends this differential sensing means changes the setting of the absolute pressure sensitive means, causing pressure to change as the airplane altitude changes, but causes the rate of decrease of pressure or rate of increase of pressure in the aircraft cabin to be at a slower rate of pressure change than ambient pressure, thus assuring maximum comfort for the passengers.

It is an object of my invention to provide a pressure regulator for controlling the pressure in an enclosure in which the difference between cabin pressure and ambient altitude pressure is employed to modify the action of the isobaric control or bellows so that the rate of change in the cabin will be less than the rate of change of ambient pressure. In this way maximum comfort is assured for the passengers and undesirable effects of fast climb or fast descent of aircraft will be prevented from causing high rates of change of cabin pressure which would cause discomfort to the passengers.

It is a further object of my invention to provide a pressure regulator of the character described in which the pressure in the enclosure may be selectively set at different pressure altitudes independent of the altitude at which the aircraft may fly, the control mechanism always being under the general supervision of a differential means which always prevents the differential between cabin and ambient pressure from exceeding a predetermined safe amount.

It is a further object of my invention to provide a combination as referred to in the second preceding paragraph in which there is an isobaric bellows connected to a pivoted arm whereby the altitude pressure to be maintained by the regulator may be set by changing the tension on the spring. In this structure the pivoted arm is connected to operate a valve which controls the pressure in the regulator. Acting in conjunction with these parts is a modifying device which modifies the action of the isobaric bellows for the purpose of causing the rate of pressure change in the regulator and in the enclosure to be less than the rate of pressure change of ambient pressures.

It is a still further object of my invention to provide cabin pressure regulator which is entirely automatic in its operation and which will permit the pilot, upon take-off, to set the cabin pressure control means so that when the airplane lands at an airfield of different altitude the pressure regulator will have functioned in such a manner that the pressure of the cabin or enclosure is the same as the ambient pressure at the landing airport with the result that when the doors are opened there will be no affect on the passengers.

It is an object of my invention to provide a cabin pressure regulator of the type referred to in the preceding paragraph in which the change of cabin pressure will change as ambient pressure changes or in which the change is caused by a slowly operating rate of change means which may be set by the aircraft pilot.

It is a still further object of my invention to provide a cabin pressure regulator of the type referred to having as one of its elements a means which responds to rate of change of ambient pressure and which functions to prevent rate of change taking place in the cabin whenever the airplane is maintaining substantially a constant altitude.

It is an object of my invention to provide a cabin pressure regulator having a spring with rate of change means for adjusting the tension of the spring in combination with means responding to change of ambient pressure for rendering the rate of change means inoperative when ambient pressure remains substantially constant.

Other objects and advantages of the invention will be brought out during the course of the following detailed description of a preferred form of my invention designed especially for use in airplanes.

Brief description of the drawings

Referring to the accompanying drawings.

FIG. 2 is a fragmentary cross-sectional view through the cabin pressure altitude selector of my invention;

FIG. 3 is a fragmentary view showing a face view of the altitude selector and other controls which will be described;

FIG. 4 is a fragmentary face view of a commutator of the altitude selector indicating various positions of the altitude selector arm;

FIG. 5 is a fragmentary view of the differential control which at all times prevents cabin pressure from exceeding ambient pressure by more than predetermined amount;

FIG. 6 is a graph illustrating the manner in which the the regulator of my invention will function, particularly when take-off and landing altitudes are the same; and FIG. 7 is a graph illustrating the manner in which cabin pressures are controlled where the landing field altitude is different from the take-off field altitude.

Description of the preferred embodiment

Figure 1:
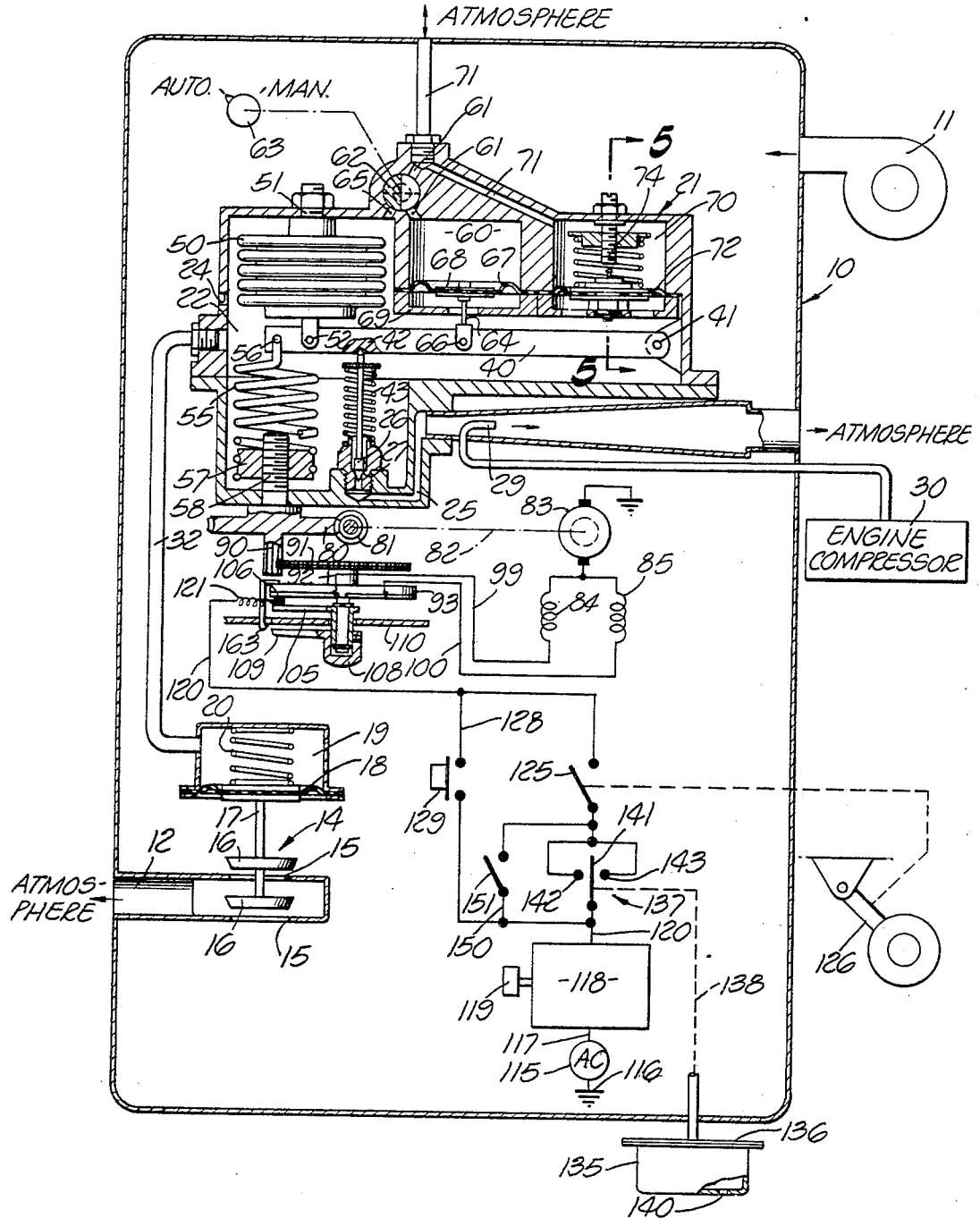
FIG. 1 is a diagrammatic view illustrating an enclosure and the various parts of the regulator of my invention which accomplishes the results and objects previously referred to and which will further be referred to and amplified in the following detailed description of my invention.

Referring to the drawings, and particularly FIG. 1, the numeral 10 represents an enclosure which, in this form of my invention, is an aircraft cabin which is air tight and which is designed to withstand predetermined pressure differentials which come within the master pressure differential control of the invention. The enclosure is provided with a pressure supplying means in the form of a pump 11, which in an aircraft supplies air to the interior of the enclosure or cabin 10. If my invention were used in missiles or rockets where the pressure was required to be controlled and where an atmosphere other than air was to be maintained, obviously the source of pressure could be some gas other than air.

The cabin 10 has an exhaust passage 12 which is connected to the ambient atmosphere. The outlet is controlled by a balance valve 14 having a pair of outlet openings 15 and a pair of valves 16 which move toward and away from the openings 15 in order to control the outflow from the cabin. In the form of my invention shown the valves 16 are mounted on a stem 17 connected to a diaphragm 18. One side of the diaphragm 18 is exposed to cabin pressure and the other side of the diaphragm is exposed to the pressure of air in a chamber 19 and to the pressure of a spring 20. By changing the pressure in the chamber 19 a different level of control is established. For example, an increase in chamber pressure will result in the valves 16 moving away from their seats with the result that more air will escape from the cabin and its pressure will reduce. As cabin pressure decreases the diaphragm will be moved back to its normal position and thereafter the cabin pressure will be held at its new pressure due to the balance of pressure on opposite sides of the diaphragm 18.

My regulator includes a housing 21 which provides a chamber 22, which is a pressure chamber, and the pressure within the chamber 22 may be referred to as reference pressure because the pressure maintained in the chamber 22 controls the pressure to be maintained in the cabin 10. The chamber 22 has an inlet passage 24 whereby air may flow from the cabin 10 into the chamber 22 and has an outlet passage 25 which is connected to ambient atmosphere as illustrated.

The outlet passage is controlled by a valve 26 adapted to be moved toward and away and to engage a valve seat 27 which surrounds the inner end of the passage 25.

The position of the valve 26 controls the outflow through the passage 25 and, therefore, controls the pressure in the chamber 22.

In the outflow passage 25 is a means for inducing an outflow from the chamber 22 and this means is illustrated as an injector jet 29 supplied by air under pressure by an engine compressor 30.

In order that the pressure in the chamber 19 may be the same as the pressure in the chamber 22 there is a connecting tube 32. When the pressure in the chamber 22 reduces, the pressure in the chamber 19 reduces, and this causes the diaphragm 18 to move in a direction to open the valve 16, as explained above. When the pressure of the cabin 10 is reduced to approximately the pressure of the chamber 22 the pressures on opposite sides of diaphragm 18 will be in balance and the valve 16 will be repositioned so that the inflow caused by the pump 11 and the outflow passage are so proportioned that the pressure in the chamber will be maintained constantly. When the pressure in the chamber 22 changes, by the action just described, the pressure in the cabin will be caused to change.

There is an arm 40 pivoted in the chamber 22 at 41, and the stem of the valve 26 is operatively connected to this arm at 42 so that the valve 26 moves toward closed position when the arm moves down and toward open position when the arm moves up. In the form of the invention shown the end of the valve stem is held against the arm 40 by means of the compression spring 43. Isobaric means in the form of an evacuated bellows 50 is connected to the housing at 51 and to the arm 40 at 52. If the bellows 50 expands the arm 40 is swung downward. If the bellows 50 collapses the free end of the arm 40 is moved upward. The bellows 50 is caused to expand or contract by a change of pressure in the chamber 22 so that an increase in pressure in the chamber 22 tends to open the valve 26, whereas a decrease of pressure in the chamber 22 tends to close the valve 26.

My invention also provides a means for applying a variable force affecting the operation of the bellows 50 and this means is provided in the form of a spring 55 connected to the arm at 56. The opposite end of the spring 55 is connected to a nut 57 which is raised or lowered by the rotation of a screw 58. Rotating the screw 58 in one direction moves the nut 57 downward, thus increasing the tension on the spring 55 and visa versa. If it is desired to maintain the pressure in the chamber 22 at a higher pressure, spring tension is increased. If it desired to lower the pressure in the chamber 22 spring tension is decreased. An important part of my invention is the provision of means for controlling the rate of pressure change in the chamber or means for causing the rate of pressure change in the cabin to be less than the rate of pressure change of ambient atmosphere. This means comprises a chamber 60 connected to atmosphere through passage 61, which includes a valve 62. When the valve 62 is in the position shown the rate of pressure change is automatic and the chamber 60 is connected to ambient atmosphere as shown. By rotating the knob 63 connected to the valve 62, the chamber 60 may be disconnected by atmosphere and connected through a passage 65 with the interior of the chamber 22. In this position there is an operation which is called a manual operation and will be described later. Extending across the chamber 60 is a diaphragm 67 having a central plate 68 and having its perimetric portion clamped tightly in place by a cover plate 69.

Extending from the disc and central part of the diaphragm 67 is a stem 64 connected at 66 to the arm 40. When the parts are in the position shown in FIG. 1 the upper side of the diaphragm 67 is exposed to ambient pressure and the lower side of the diaphragm is exposed to chamber 22 pressure.

The control means now being described functions to exert a force on the arm 40 which modifies the operation of the isobaric means 50. As an illustration, if the airplane is climbing in altitude ambient pressure is decreasing with the result that the diaphragm 67 is moved upwardly and an upward force is exerted on the arm 40. This force is in a direction in opposition to the tension of the spring 55, and is in a direction tending to collapse the bellows 50. When the airplane is flying level the force exerted by the diaphragm 67 remains constant and when the airplane is descending the force exerted by the diaphragm 67 on the arm 40 is decreased. When the pressure in the chamber 22 is equal to the pressure in the chamber 60 or equal to ambient pressure, then no force is being exerted on the arm 40 by the diaphragm 67.

The operation of this control element in controlling rate of change of cabin pressure will be described when the mode of operation of my invention is being discussed.

My invention provides a control which prevents cabin pressure from exceeding ambient pressure by a predetermined amount. This control is illustrated in FIG. 1 and includes a chamber 70 which is at all times exposed to ambient atmospheric pressure by a passage 71. Across the lower end of the chamber 70 is a diaphragm 72. The upper side of the diaphragm 72 is always exposed to ambient pressure and the lower side of the diaphragm 72 is always exposed to chamber pressure. As shown in FIG. 5 the housing 21 carries a stop 74 and the central part of the diaphragm 72 carries a valve 75 which, in the form of the invention shown, is the well-known Schrader valve.

When the pressure in the chamber 70 reduces to a predetermined differential over that in the chamber 22, the diaphragm will move upward and a valve stem 76 of the Schrader valve 75 will engage the stop 74 and open a passage through the Schrader valve, thus releasing air from the chamber 22. When enough air has been released from the chamber 22 to bring the pressure below the critical differential point, the diaphragm 72 will move downward and the Schrader valve will close. In this way the pressure in the chamber 22 can never exceed ambient pressure by more than a predetermined amount. Consequently, the pressure in the cabin 10 can never exceed ambient pressure by more than a predetermined amount. This is an ironclad safety factor which is a necessary element of a cabin pressure regulator, since airplane designers design the cabin to withstand predetermined maximum pressure differentials.

For the purpose of slowly adjusting the tension of the spring 55 in order to slowly change the pressure in the chamber 22, and hence cabin pressure, I provide the screw 58 with a gear 80, which is rotated by a worm 81. This worm 81 is secured to a shaft 82 and is rotated in either direction because it is connected to the rotor of a motor 83. The motor 83 is provided with two sets of windings 84 and 85, which windings are connected in electrical circuitry whereby either of the windings may be energized to rotate the shaft 82 in the desired direction.

In my invention there is an altitude selector whereby the altitude pressure of the cabin may be preselected and may be maintained. This altitude selector includes a small gear 90 which drives a gear 91 which rotates a shaft 92. Mounted on the shaft 92 is a disc 93 carrying a pair of arcuated or commutator contacts 95 and 96, the ends of which are separated by insulation blocks 97 and 98.

The commutator contact 95 is connected by a wire 99 to the winding 84 and the commutator contact 96 is connected by a wire 100 to the winding 85.

Rotatable on the shaft 92 is a brush arm 105 which carries a brush 106 adapted to contact either one of the commutators 95 or 96 or insulation blocks 97 or 98. The arm 105 is mounted on a hub 107 on which is mounted a knob 108 having a pointer 109, which is in radial alignment with the arm 105. There is a face plate 110, shown best in FIG. 3, and on this face plate is a dial 111 concentric on the shaft 92, the dial indicating altitudes from zero to ten thousand feet. By turning the knob 108 the arm 105 and pointer 109 are rotated and the altitude selector may be thereby set to select the desired cabin altitude. For example, when the pointer 109 points to zero altitude, the altitude of the cabin will be maintained at sea level. When the pointer 109 points to five thousand feet the altitude in the cabin will be maintained at a five thousand foot pressure altitude and when the knob is turned so that the pointer points to ten thousand feet, the pressure altitude in the cabin will be maintained at ten thousand feet. This operation will be described after additional parts have been identified.

The energizing of the motor 83 and its direction of rotation is controlled by the altitude selector and various switches which will now be described.

As shown in FIG. 1, there is an A.C. source of power 115, which is grounded at 116 and is connected by a wire 117 to a pulse oscillator 118. This pulse oscillator is a standard item which may be purchased on the open market and is identified as S.C.R. motor control and functions to deliver electrical pulses to operate the motor 83. The rate at which the pulses are delivered is controlled by a pulse rate knob 119 shown in FIG. 1 and also shown in FIG. 3. By rotating the knob 119 between minimum and maximum positions the speed at which the motor is operated may be controlled. Extending from the pulse oscillator is a circuit wire 120, which is connected by a pigtail 121 to the brush 106. When suitable switches are closed current will flow from ground 116 to the brush 106, and if the brush is in engagement with either commutator contact 95 or 96 will flow to either one of the windings 84 or 85 and through the motor to ground.

In order that the altitude selector may not operate to reset the tension of the spring 55 while the aircraft is on the ground I provide a switch 125 operatively connected to the landing gear 126 of the aircraft so that the switch 125 is closed only when the landing wheels are retracted. Therefore, the motor 83 cannot be operated unless the landing wheels are in retracted position. There is, however, a parallel circuit 128 having a manually operable switch 129 which enables the pilot to manually set or reset the altitude selector as will be described later.

A further control in this circuit is a means for preventing operation of the motor 83 and hence a changing of pressure setting of the cabin, except when the aircraft is climbing or descending in altitude. There is provided on the exterior of the cabin wall a chamber 135 having a diaphragm 136 operatively connected to operate a switch 137. This operable connection may be electrical, for example, through microswitches, or may be mechanical. The connection in FIG. 1 is diagrammatically illustrated at 138. The chamber 135 has a small opening 140. When the pressure in the chamber and ambient pressure are the same the diaphragm 136 is in the position shown and holds a movable switch element 141 in a non-engaging position in which position the contact 141 does not engage either the contact 142 or the contact 143. This switch 137 is in series with the switch 125 and, therefore, even though the landing gear were raised and the switch 125 closed, the circuit 120 would be open and the motor 83 would not be energized. This condition exists whenever the pressure in the chamber 135 is the same as ambient air pressure, and represents a condition which exists when the aircraft is on the landing field or is flying at a constant altitude.

When the airplane is climbing ambient pressure is reducing with the result that the pressure within the chamber 135 is greater than ambient. This forces the diaphragm 136 outwardly and this would move the switch member 141 into engagement with the contact 142 and the circuit to the motor 83 would be completed, assuming, of course, that the landing gear has been raised. The unbalance of pressure results from the fact that the opening 140 is so small that the air will not flow out at a fast enough rate to cause the pressure in the chamber and around the chamber to be the same. When the airplane is descending the pressure on the exterior of the chamber 135 becomes greater and the diaphragm will be forced inwardly, thus causing the switch member 141 to engage the contact 143. It will, therefore, be seen that by this arrangement the tension of the spring cannot be adjusted automatically when the aircraft is flying at a constant altitude. The operator, however, can manually adjust the tension of the spring by using the manual switch 139. Also, there is a bypass circuit 150 having a manually operable switch 151 whereby the ambient pressure control means may be bypassed.

The various operations of my invention will now be described. Assuming that the aircraft is on the ground at sea level, ambient atmospheric pressure exists in the chamber 22 and in the chamber 19 of the outlet valve control. Due to the fact that the altitude selector is now set at airport altitude, which is zero and which is indicated by the pointer 109, the force of the spring 55 pulling on the bellows 50 and atmospheric pressure trying to collapse the bellows 50, the two forces will balance out each other. It is recommended that the altitude selector be set at approximately two hundred feet above airport altitude so that when the engines are started air from the engine compressor 30 flows through the jet tube 29 and the jet pump action will place a vacuum on the metering valve 26, which valve is open because the altitude selector has been set slightly above the airport altitude. As air flows into the chamber 22 through the opening 24 the pressure in the chamber 22 will be approximately one-quarter of an inch of mercury higher than airport pressure. The low pressure air flows through the duct 32 and will reduce the pressure in the chamber 19 so that it is the same as the pressure in the chamber 22. Atmospheric pressure, which is the airport pressure, on the diaphragm 18, overcomes the force of the spring 20 and opens the outflow valves 16. When the airplane starts down the taxi strip and air pump 11 is started air flows into the cabin 10 and out through the previously opened outflow valve 16, and, therefore, no air bump is felt on the passengers' ear drums. When the airplane takes off airport level air plus the air from the pump or compressor 11 is flowing through the cabin outlet 12, the pressure in the cabin 10 starts to drop, and when the airplane reaches an altitude of approximately two hundred feet above ground level the cabin outflow valve starts metering air flow through the outflow passage 13, and, therefore, controls cabin pressure at an altitude of approximately two hundred feet above the altitude of the airport.

With the control set in automatic, which is done by placing the valve 63 in the position shown in FIG. 1, the bellows 50 and spring 55 are attempting to control the pressure in the chamber 22 and maintain it at two hundred feet above airport level. However, as the airplane climbs the pressure in the chamber 60 on the upper side of the diaphragm 67 decreases because it is connected to ambient pressure through the passages 61 and 71. The diaphragm 67, therefore, tends to move in an upward direction and tends to exert a force on the arm 40, which is opposite to the force of the spring 55. As altitude increases and ambient pressure decreases this force exerted by the diaphragrm 67 becomes greater and greater, causing the pressure in the chamber 22 to regulate at a lower and lower pressure just the same as it would if the tension of the spring 55 were slowly relaxed.

FIG. 6 is a flight diagram illustrating this operation of the mechanism. In this diagram horizontal distances represent time in minutes and the vertical line represents pressure in inches of mercury or thousand feet increments. Curve 155 shows an aircraft taking off from a sea level airport and climbing to an altitude of fifty thousand feet at a rate of two thousand feet per minute. Curve 156 shows cabin altitude during this flight. If the aircraft should level off at thirty thousand feet instead of fifty thousand feet and take a flight as shown on curve A, cabin altitude would be as shown on curve A'. Curve B shows the airplane leveling off at twenty thousand feet and curve B' shows the cabin altitude pressure. This flight taking off at a sea level airport and landing at a sea level airport requires no resetting of the regulator. In other words, the pointer 109 is left at zero and the functioning of the regulator is wholly automatic. It will be noted from FIG. 6 that when the airplane is climbing at a rate of two thousand feet per minute the cabin is climbing at a rate of four hundred feet per minute. Furthermore, if the aircraft descends at two thousand feet per minute, the cabin will descend at approximately four hundred feet per minute. This difference in rate of climb or rate of descent of ambient atmosphere v. cabin atmosphere is brought about by the functioning of the diaphragm 67 which exerts a force on the arm 40, which is counter to the force exerted on this arm by the spring 55. If it is desired to modify the rate of cabin pressure change relative to the rate of ambient pressure change this may be done by changing the size of the disc 68.

Very seldom does a commercial aircraft ever climb faster than two thousand feet per minute and most flights are made with the climb or descent being at approximately one thousand feet per minute. In my invention, when the aircraft is climbing at one thousand feet per minute from a sea level airport, the cabin could climb at approximately two hundred feet per minute, thus bringing the pressure change well within the range at which there should be no pressure affect on the ear drums of the passengers.

In FIG. 6 curve 157 indicates the safe differential pressure at which a Boeing 707 airplane may operate. Cabin altitude must stay above curve 157.

If the control is set on manual, which is done by rotating the knob on the valve 63 to disconnect the chamber 60 from atmosphere and to connect the chamber 60 to the chamber 22, the pilot should, before take-off, set the altitude selector to the maximum altitude desired in the cabin during flight. This is done by rotating the knob 108 so that the pointer 109 will point to the desired altitude, for example, five thousand feet, as indicated by dotted lines 160. This causes the following operation to occur: the brush arm 105 will, as shown in FIG. 4, be moved into dotted line position 161. This removes the brush 106 from the insulation block 97 and causes it to engage the commutator contact 95 as shown. When the airplane leaves the ground switch 125 will be closed and the following action takes place: current will flow from the brush 106 to the commutator contact 95 through the circuit 99, energizing the field winding 84 and from thence to ground. This will cause the motor to rotate in a direction which will decrease the tension on the spring 55. As the tension is being decreased on the spring 55 gears 90 and 91 are rotating the shaft 92 in a clockwise direction shown in FIG. 4, and this operation will continue until the insulation block 97 moves into dotted line position 162, at which time the circuit will be broken and the motor 83 deenergized. In order that the pilot may know the exact location of the insulation block 97 there is an indicator 163 secured to the disc in alignment with the insulation block and this indicator projects through a slot in the dial where it may be seen by the pilot. When the disc 93 has moved to bring the insulation block 97 into alignment with the brush 106 and into a position indicated by dotted lines 162, the indicator will have moved to the position indicated by dotted lines 164 and the pilot will, therefore, know that the regulator has been reset to a position to maintain cabin pressure at a five thousand foot altitude.

The rate of pressure change in the cabin is controlled by the rate of change of the tension in the spring 55. This rate may be changed to increase speed or decrease speed by adjusting the knob 119 of the pulse oscillator 118.

If a situation should occur where the cabin pressure regulator is not set at the field altitude upon take-off it may be so set by moving the pointer 109 to field altitude and then pressing the button to close switch 129, which will rotate the disc 93 to bring the insulation block 97 into alignment with the brush arm 105 and the pointer 109.

The regulator of my invention has two distinct modes of operation. If the airplane has a flight schedule where the take-off and landing fields are at the same altitude, as previously referred to, the regulator when set in automatic will keep the aircraft cabin at the greatest possible comfort level and require no attention from the pilot, such as mathematical calculations on how to set the pressure change of the cabin for the greatest comfort. This automatic mode of operation is accomplished when the valve 63 is in its automatic position, as shown in FIG. 1. The control senses the differential between reference pressure or the pressure in the chamber 22 and atmospheric pressure, and as the airplane climbs or descends this differential sensing means changes the setting of the absolute pressure sensitive means, causing the pressure in the chamber 22 to change as airplane altitude changes, thus causing the cabin to climb or descend or at a slower rate of pressure change, as shown in FIG. 6. The second mode of operation is one in which the desired maximum cabin pressure is determined and the rate of change means for changing the tension on the spring 55 is then slowly operated to slowly bring this cabin pressure to the desired level.

A very important feature of the present invention is that the pilot may preset the cabin pressure controls so that when the airplane is landing at an airfield having a different altitude than the take-off airfield, the pressure in the cabin will be the same as the landing field pressure.

FIG. 7 is a chart or graph which illustrates the manner in which the pressure of the cabin is controlled where the altitude of the take-off field is at sea level and the altitude of the landing airport is at five thousand feet.

Before take-off it will be assumed that the regulator is set to maintain the cabin at sea level altitude. The pilot turns the knob 108 to the altitude of the landing field, which in this case is five thousand feet. The pointer is thus moved to the position indicated at 160 in FIG. 3. When the aircraft takes off the switch 125 will be closed and the motor 83 will be operated to adjust the tension of the spring so that it will cause the cabin pressure regulator to maintain a pressure of 25.9 inches of mercury, which is the altitude pressure at five thousand feet. The parts may then operate as previously explained to rotate the disc so that the indicator 163 will slowly move into the position indicated by dotted lines 164 in FIG. 4.

The flight from take-off to landing is estimated at two hours and the aircraft is to climb to an altitude of thirty thousand feet at the rate of one thousand feet per minute. The flight of the aircraft is indicated by the line 170 in FIG. 7, which shows the ambient atmospheric pressures during the flight. The airplane climbs to an altitude of thirty thousand feet in approximately thirty minutes. It remains at this altitude for one hour and then, during the last thirty minutes of its flight, descends to the landing field, which is at a five thousand foot altitude.

Curve 171 illustrates the altitude of the cabin with the control set in automatic and with the altitude selector set at five thousand feet, as previously described. The cabin altitude will climb at the rate of 218 feet per minute and will reach a cabin altitude of sixty-five hundred feet and stay at this altitude for one hour and then, as the aircraft descends, the cabin altitude will drop from sixty-five hundred feet to five thousand feet in the thirty minute descending period and when the airplane arrives at the airport the pressure in the cabin will be the same as the pressure outside the cabin.

Curve 172 of FIG. 7 shows the operation of the regulator with the controls set on manual. In other words, with the valve 63 adjusted to dotted line position and with the rate of change control set at a two hundred foot per minute climb. It will be seen that under these circumstances the cabin altitude climbs from zero to five thousand feet in twenty-five minutes and remains at this altitude for the remainder of the trip. In this instance, as in the previous example, the cabin altitude will be identical to landing field altitude and there will be no air bumps or discomfort to the passengers.

In this last-mentioned operation the disc 93 is rotating at such a speed that when the landing airport is reached the insulation block will have reached the position indicated by dotted lines 162 in FIG. 4.

Because of the fact that the switch 137 is in series with the switch 125, if the pilot should at any time fly the aircraft at a uniform altitude the movable contact 141 will be disengaged with both the contacts 142 and 143 with the result that the motor 83 will be deenergized. Therefore, during the last-mentioned type of flight the bypass switch 151 is closed in order that the rate of change means will continue to operate even though the aircraft is flying level for substantially one hour of its two hour flight.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described merely being by way of example and we do not wish to be restricted to the specific form shown or uses mentioned except as defined in the accompanying claims, wherein various portions have been separated for clarity of reading and not for emphasis.

I claim:
1. A pressure regulator for controlling the pressure in an enclosure comprising:
 (A) a housing providing a pressure chamber having an inlet and an outlet passage;
 (B) valve means for one of said passages;
 (C) control means for said valve means having an isobaric control and a differential pressure sensing means sensitive to and responsive to pressure in said chamber and also to pressure outside said enclosure, said isobaric control and said differential pressure sensing means being operatively connected so as to jointly control the operation of said valve means to control the pressure in said chamber;

(D) enclosure pressure control means governing the flow of air through said enclosure having a movable control element exposed to enclosure pressure; and
(E) means whereby the pressure in said chamber is employed to operate said enclosure pressure control means to control the pressure in said enclosure.

2. A combination as defined in claim 1, including: means whereby the pressure in said chamber may be selectively set at different pressures.

3. A combination as defined in claim 1, including: means for connecting said chamber to the exterior of said enclosure.

4. A combination as defined in claim 1 in which said outlet passage is connected to the exterior of said enclosure and which also includes means for inducing in outflow from said chamber through said outlet passage.

5. A combination as defined in claim 1 in which said valve means controls the outflow through said outlet passage.

6. A combination as defined in claim 1, including:
(A) means for connecting said differential pressure sensing means to chamber pressure only.

7. A combination as defined in claim 1, including:
(A) spring means associated with said control means for changing the pressure to which said chamber may be set;
(B) rate of change means for adjusting the tension of said spring means; and
(C) means responsive to the pressure outside said enclosure for rendering said rate of change means inoperative when the pressure outside said enclosure remains substantially constant.

8. A combination as defined in claim 1 in which said control means and said differential pressure sensing means automatically change the pressure in said chamber at a rate slower than the change in ambient pressure.

9. A combination as defined in claim 1 in which said differential pressure sensing means is operatively connected to modify the action of said isobaric control whenever said enclosure is moving from one altitude to another.

10. A combination as defined in claim 1 in which said isobaric control and said differential pressure sensing means are mechanically linked together and operate said valve means to control the pressure in said chamber proportional to the rate of climb or rate of descent of said enclosure.

11. A combination as defined in claim 10 in which the rate of change of the pressure in said chamber is slower than the rate of change of ambient pressure during ascent or descent of said enclosure.

12. The combination including:
(A) an enclosure adapted to move through different altitudes in moving from a first location at one altitude to a second location at a different altitude;
(B) a housing providing a pressure chamber having an inlet connected to said enclosure and an outlet connected to the exterior of said enclosure;
(C) control means in said chamber having an isobaric control and a second control sensitive to and responsive to the pressure in said pressure chamber and also to the ambient pressure outside said enclosure, said controls jointly controlling the pressure in said pressure chamber whereby the pressure in said pressure chamber is caused to change when the enclosure is moving from one altitude to the other at a rate of change proportional to the change in ambient pressure;
(D) enclosure pressure control means for governing the pressure in said enclosure, the operation of which is controlled by the pressure in said chamber;
(E) means for setting said isobaric control to cause the pressure in said chamber to be approximately ambient pressure at said first location; and
(F) means for resetting said isobaric control to cause the pressure in said chamber to be approximately the same as ambient at said second location.

13. A combination as defined in claim 12, including a spring connected to said isobaric control and adjusting means to slowly adjust the tension of said spring.

14. The combination as defined in claim 12, including manual and automatic means for adjusting said isobaric control to any desired pressure control level.

15. Pressure control for an enclosure adapted to be propelled at different altitudes, the combination including:
(A) means for setting pressure in said enclosure at the pressure of ambient at take-off altitude;
(B) means operative in the same pressure zone of operation as said first named means and responsive to a change in ambient pressure for changing the pressure in said enclosure to a different pressure when said enclosure is changing in altitude at a rate slower than the rate of change of ambient pressure; and
(C) said first means being operable to cause the pressure inside and outside the enclosure to be the same at said original take-off altitude and also to cause the pressure inside and outside the enclosure to be the same at said landing altitude.

16. A combination as defined in claim 15, including:
(A) means for preventing the differential between enclosure pressure and ambient pressure from exceeding a predetermined maximum.

17. A pressure regulator for controlling the pressure in an enclosure which is adapted to move at different altitudes, comprising:
(A) a housing providing a pressure chamber having an inlet and an outlet passage;
(B) valve means for controlling the flow through one of said passages;
(C) isobaric means in said chamber operatively connected to said valve means to control the pressure in said chamber;
(D) means operative for modifying the effect of said isobaric means in positioning said valve means;
(E) means operatively connected to said isobaric means for exerting a force opposite to said means to position said valve means so as to modify the pressure in said chamber;
(F) enclosure pressure control means governing the flow of air through said enclosure; and
(G) means whereby the pressure in said chamber is employed to control the operation of said enclosure pressure control means.

18. A combination as defined in claim 17, in which said isobaric means and said valve means are connected together by an intermediate arm and in which said spring means is connected to said intermediate arm.

19. A combination as defined in claim 17, in which said means for exerting a force opposite to said spring means operates in response to an increase or decrease of the pressure surrounding said enclosure.

20. A pilot pressure regulator for controlling a reference pressure which is used to set the control point of an enclosure pressure regulator which controls the pressure in the enclosure of a vehicle adapted to move at different altitudes, the combination including:
(A) a housing providing a pressure chamber having an inlet and an outlet passage;
(B) a valve for one of said passages;
(C) a control means for said valve having an isobaric control and a differential pressure sensing means mechanically linked together, the isobaric control being responsive to the pressure in said chamber and the differential pressure sensing means being responsive to the difference in pressure between chamber pressure and ambient pressure, and said isobaric control and differential pressure sensing means jointly operating at the same time to control the pressure in said chamber proportional to the rate of climb or rate of descent of said enclosure; and (D) means whereby the pressure in said chamber is employed to change the setting of said enclosure pressure regulator.

References Cited

UNITED STATES PATENTS

| | | | |
|---|---|---|---|
| 2,672,085 | 3/1954 | Fischer | 98—1.5 |
| 2,669,175 | 2/1954 | Fischer | 98—1.5 |
| 2,873,661 | 2/1959 | Fischer | 98—1.5 |

MEYER PERLIN, Primary Examiner

UNITED STATES PATENT OFFICE
CERTIFICATE OF CORRECTION

Patent No. 3,485,161    Dated December 23, 1969

Inventor(s) JAMES M. KEMPER

It is certified that error appears in the above-identified patent and that said Letters Patent are hereby corrected as shown below:

Column 5, line 2, before "means" insert --a pressure sensing same line, before "for" insert --which is sensitive and responsive to the pressure in the chamber and also to the ambient pressure outside the enclosure--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents